United States Patent [19]

Wallskog et al.

[11] Patent Number: 5,336,375

[45] Date of Patent: Aug. 9, 1994

[54] DELAYED COKER DRUMHEAD HANDLING APPARATUS

[75] Inventors: Harvey A. Wallskog, Irvine; Frank L. Landon; William R. Ruble, both of Anaheim, all of Calif.

[73] Assignee: Fluor Corporation, Irvine, Calif.

[21] Appl. No.: 168,063

[22] Filed: Dec. 15, 1993

Related U.S. Application Data

[63] Continuation of Ser. No. 921,412, Jul. 23, 1992, abandoned, which is a continuation of Ser. No. 681,098, Apr. 5, 1991, abandoned, which is a continuation-in-part of Ser. No. 431,024, Nov. 2, 1989, Pat. No. 5,048,876.

[51] Int. Cl.$^5$ .............................................. C10B 1/04
[52] U.S. Cl. ........................................ 202/96; 196/130; 202/252; 220/211
[58] Field of Search ................ 202/239, 252, 245, 261, 202/241, 262, 96, 121; 220/211, 335–338; 196/130

[56] References Cited

U.S. PATENT DOCUMENTS

| 911,524 | 2/1909 | Plantinga . |
| 1,615,878 | 2/1927 | Laird . |
| 1,871,932 | 8/1932 | Watts . |
| 1,874,833 | 8/1932 | Taylor . |
| 2,226,501 | 12/1940 | Mekler . |
| 2,776,854 | 1/1957 | Billstrom . |
| 3,379,623 | 4/1968 | Forsyth .............................. 202/252 |
| 3,888,045 | 6/1975 | Piegza . |
| 4,820,384 | 4/1989 | Pechacek ........................... 202/252 |
| 4,960,358 | 10/1990 | DiGiacomo et al. ............... 202/252 |

FOREIGN PATENT DOCUMENTS

| 265096 | 9/1987 | European Pat. Off. . |
| 210294 | 1/1967 | Sweden . |

*Primary Examiner*—Joye L. Woodard
*Attorney, Agent, or Firm*—Lyon & Lyon

[57] ABSTRACT

A delayed coker drumhead handling apparatus, which includes remotely operable trammel pivot apparatus to open and close the coke drum by moving the drumhead downwardly and laterally, such that the apparatus is especially suitable for use in areas of restricted clearance to the operating deck or otherwise confined space.

4 Claims, 3 Drawing Sheets

DELAYED COKER DRUMHEAD HANDLING APPARATUS

This is a continuation of application Ser. No. 921,412, filed Jul. 23, 1992, now abandoned, which is a continuation of application Ser. No. 681,098, filed Apr. 5, 1991, now abandoned which is a continuation-in-part of application Ser. No. 431,024, filed Nov. 2, 1989, now U.S. Pat. No. 5,048,876.

BACKGROUND OF THE INVENTION

1. Field of the Invention

The field of the present invention is delayed coker drums, and more particularly a drumhead handling apparatus which is especially suitable for use with such drums, in view of the high pressures, high temperatures and dirty and hazardous conditions which prevail and the requirement of the drums for frequent and rapid opening.

2. Description of the Prior Art

Many refineries recover valuable products from the heavy residual oil that remains after the normal refining operations are completed. This recovery process, known as delayed coking, produces valuable distillates and coke in a large vessel called a coke drum. Typically, coke drums are used in pairs and operated alternately. Thus, while one coke drum is being filled with the heated residual oil for a 16 to 24 hour cycle in which the volatile components are driven off for recovery elsewhere and the balance converted to coke, the other drum is being cooled and purged of the several hundred tons of coke formed during the previous recovery cycle. The operating conditions are quite severe. Normal operating pressure ranges from 40 to about 60 pounds per square inch and the feed input temperature is slightly over 900° F. In addition, operating personnel may be exposed to finely divided coke particles, steam, hot water and noxious gases, when the drum is opened.

Coke recovery operations commence following a water quench step. Steam and water are introduced into the coke filled vessel to complete the recovery of volatiles and cool the mass of coke. At this point, the vessel is vented to atmospheric pressure and the top head (typically a 4-foot diameter flange) is unbolted and removed to enable placement of the hydraulic coke cutting apparatus. After the cooling water is drained from the vessel, the bottom head (typically a 7-foot-diameter flange) is unbolted and removed to allow the hydraulically cut (i.e., high pressure water jet) coke to fall out. A typical operating procedures manual will state: "Protective rain gear and face shields must be worn when deheading top and bottom coke drumheads".

In a typical delayed coker processing system, as described and illustrated in commonly assigned U.S. Pat. No. 5,098,524, filed Jul. 29, 1988, entitled "Coke Drum Unheading Device", the first step in the current practice of removing coke involves placing a deheading cart under the drum, raising a flange support ram, with braces installed, and loosening some (up to one half) of the flange bolts by manual operation with an impact wrench. Following the water quench and drain, the remaining bolts are manually removed, braces are removed from the ram, the approximately 4-ton flange is lowered, and the cart, with flange resting thereon, is moved away.

The conventional coke drum deheading process is thus hazardous because of the required manual operations in conjunction with the drum, which holds a large quantity of coke that may be loose, and various amounts of hot water. In Antalffy, et al., U.S. Pat. No. 5,098,524, filed Jul. 29, 1988, entitled "Coke Drum Unheading Device", commonly assigned with this application, and in the paragraph entitled "Closure Apparatus Application Example" of U.S. Pat. No. 5,048,876 issued Sep. 17, 1991, entitled "Closure Apparatus for Pipes and Vessels", a system and process for removing the coke drumhead are described which provide an advantageous method of coke drum unheading in installations in which a relatively great amount of vertical space exists between the bottom of the drum and the floor. The drumhead is pivoted away from the drum by remote control means so that the drum may be opened without the need for human operators in the vicinity of the drumhead. There must be sufficient space between the bottom of the drum and the floor, however, to permit pivoting of the drumhead from the shut position to the fully opened position. In some delayed coker installations presently in use, the space between the bottom of the drum and the floor is as small as 4 ½ to 5 feet, which is insufficient to permit pivoting of a drumhead of the type disclosed in pending application Ser. No. 5,098,524.

Thus, the need exists for a remote controlled coker unheading system that is suitable for use in installations where the distance between the drum and the floor is insufficient for pivoting of the drumhead.

SUMMARY OF OBJECTS OF THE INVENTION

The present invention is directed to a drumhead handling apparatus for a delayed coker which includes means by which a drumhead may be moved between an opened and a closed position in confined vertical spaces. Such means employ a plurality of hydraulic cylinders to lower and then to move the head laterally after it has been unbolted or otherwise unlocked from the coke drum.

One object of the present invention is to provide a mechanism for remotely opening a delayed coker drum in an appropriate manner and in a limited space, such as when the distance between the bottom of the drum and the deck is insufficient to permit pivoting of the drumhead.

Another object of the present invention is to provide a drumhead handling apparatus for delayed cokers that is not only simple, rugged and reliable, but also enhances operator safety, compared to conventional practice, by avoiding the exposure of operating personnel to hazardous situations (i.e., the handling of process materials -- gases, liquids and/or solids -- that present hazards such as pressure, temperature, toxicity, noise, etc.).

It is a further object of the present invention to provide a drumhead handling apparatus for delayed coker drums that is capable of rapid operations, compared to conventional practice.

DETAILED DESCRIPTION OF PREFERRED EMBODIMENTS

Figure 1:
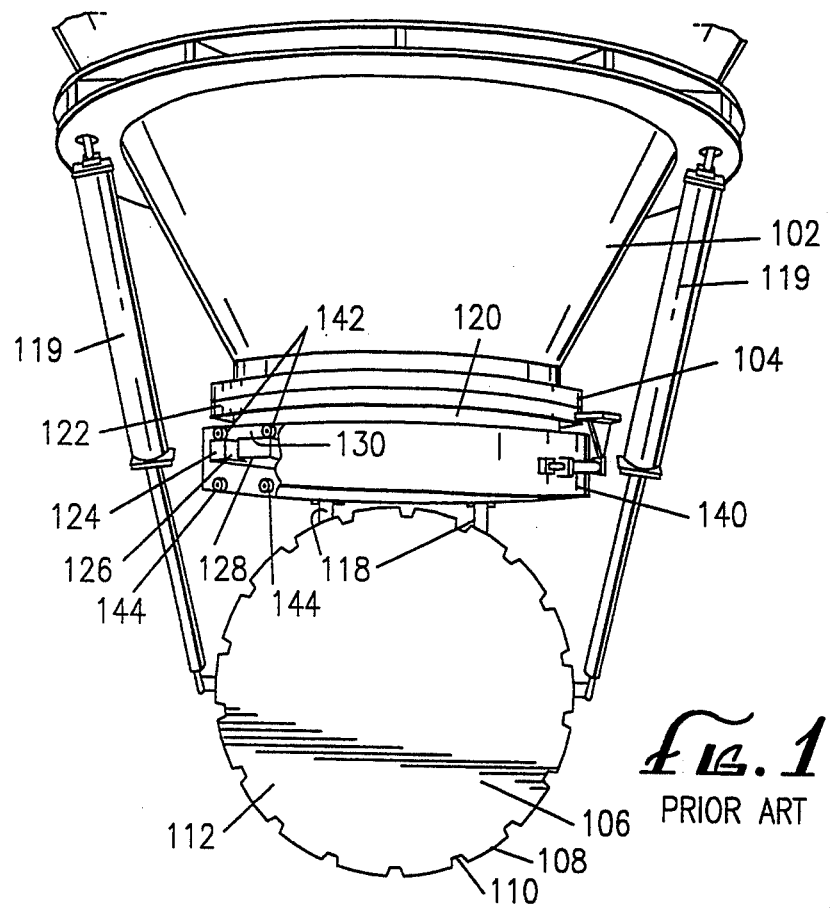
FIG. 1 is a perspective view of a delayed coker vessel equipped with the locking ring device of U.S. Pat. No. 5,048,876 and the hinged head handling apparatus of U.S. Pat. No. 5,098,524 with the head shown in an open position.

FIG. 1 shows generally the frusto-conical bottom portion 102 of a typical delayed coker vessel which has appended thereto a preferred embodiment of U.S. Pat. No. 5,048,876 (the locking ring member) and U.S. Pat. No. 5,098,524 (the hinged drumhead). The upper portion of the coke drum is not shown, but in practice may extend 60-80 feet or more above the outlet portion. The substantially circular outlet flange 104 is the terminus of the drum bottom portion 102.

In FIG. 1, the coke drum bottom portion 102 is in an open position with coke drumhead 106 open to allow the contents of the coke drum to fall into a chute (not shown) disposed below the outlet flange 104. The drumhead 106 includes a flange 108 having a plurality of circumferentially arranged slots 110 disposed therein. The drumhead 106 is shown in a configuration wherein it is pivotally mounted with respect to the drum bottom portion 102 by a pair of hinges 118. The drumhead 106 is further attached to the drum bottom portion 102 by actuator means 119 which pivot the drumhead 106 between open and closed positions.

Mounted to the outlet flange 104 of the drum bottom portion 102 is a ring support member 120. The ring support member comprises an upper flange 122 configured to mate with the outlet flange 104, through a plurality of bolts arranged circumferentially around the flanges 104 and 122. The bolts used to fasten the ring support member to the drum outlet flange are the same as used in prior art devices to fasten the drumhead itself to the drum outlet flange. The ring support member 120 further includes a lower flange 124 having a plurality of circumferentially arranged slots 126 extending therethrough. The flange 124 comprises a lower mating surface 128 and an upper bearing surface 130. The lower surface 128 is configured to mate with the upper surface 112 of the flange 108 when the coke drum is closed.

Locking ring member 140, which is described in detail in U.S. Pat. No. 5,048,876, which is incorporated herein by reference, includes upper and lower rows of a plurality of rollers 142 and 144, respectively, which may also be thought of as a series of roller pairs. Appropriate bearing means are provided so that the rollers 142, 144 may spin freely. The size and spacing of the rollers 142 and 144 are coordinated with the slots 110 and 126 in the flange 108 of the drumhead 106 and the lower flange 124 of the ring support member 120, respectively, so that the locking ring 140, when rotated about the axis of the coke drum 102, moves between positions that lock or unlock the drumhead from the coke drum discharge outlet.

Hinged drumhead member 106, which is described in detail in U.S. Pat. No. 5,098,524, which is incorporated herein by reference, includes a flange 108, a pair of hinges 118 and a pair of hydraulic cylinders 119 which are remotely operated to pivot the drumhead to open and close the coke drum vessel.

Figure 2:
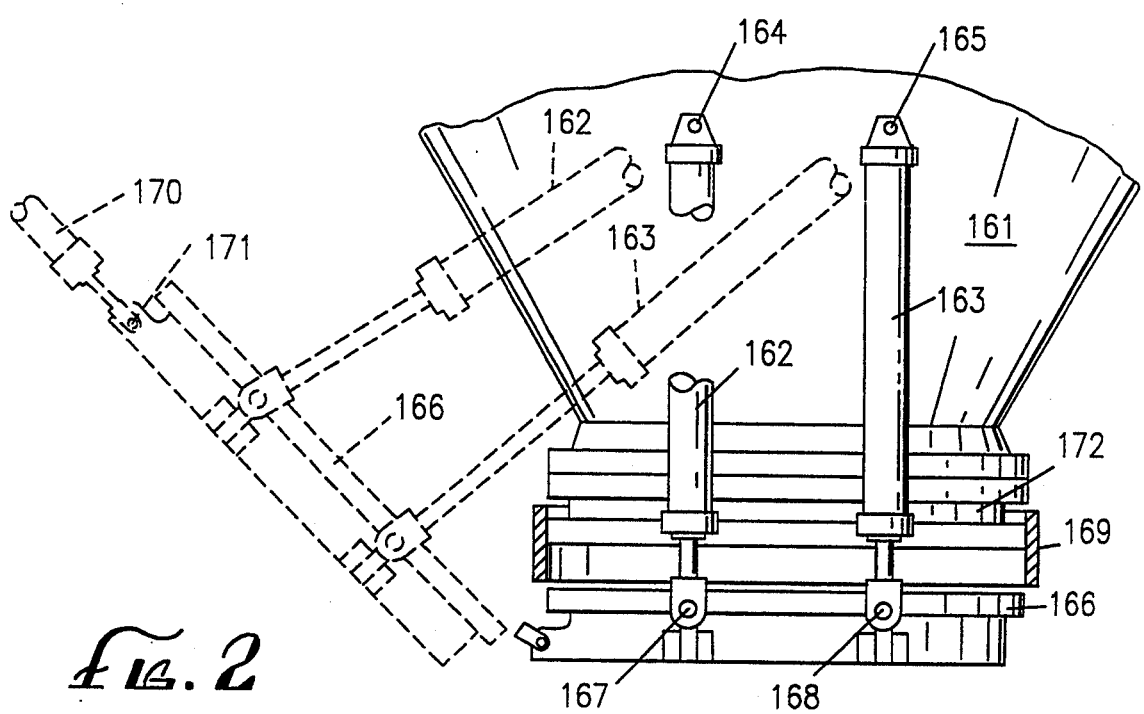
FIG. 2 is a side view of a preferred trammel pivot apparatus of the present invention.
Figure 3:
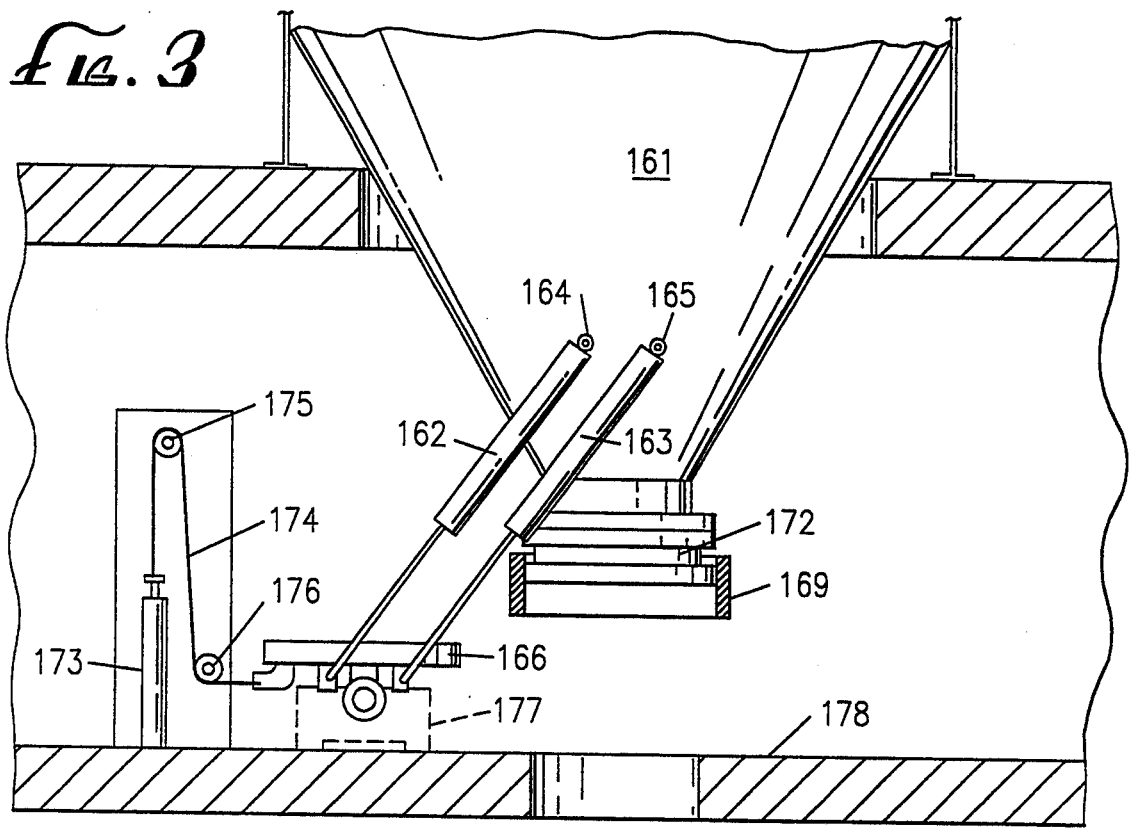
FIG. 3 is a side view of the FIG. 2 apparatus with the coke drum open and the drumhead placed on a maintenance support stand.
Figure 4:
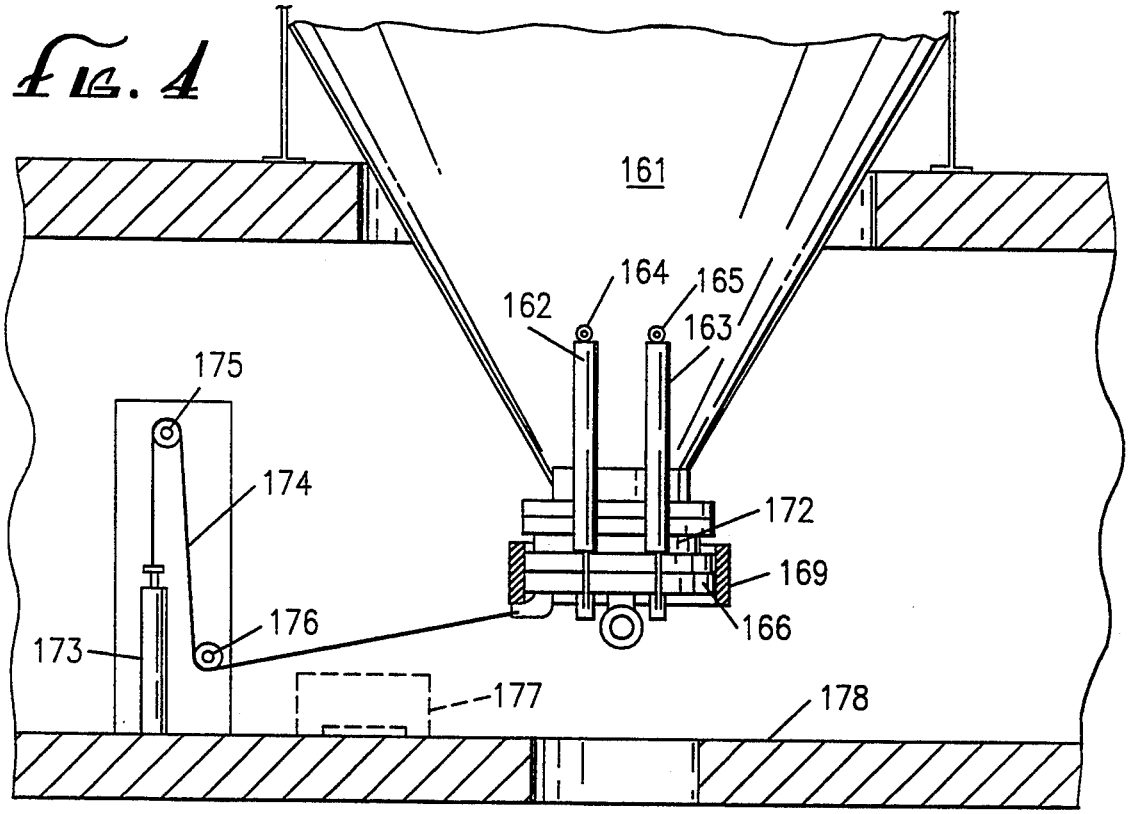
FIG. 4 is a side view of the FIG. 2 apparatus with the drumhead in the coke drum closed position.

Referring now to FIGS. 2-4, a trammel pivot drumhead handling apparatus is illustrated in accordance with the present invention. Attached to drum 161 are four hydraulic cylinders which position and support drumhead 166. In FIG. 2, two cylinders, 162 and 163, respectively, are shown. Two identical cylinders are positioned on the opposite side of the drum directly behind those shown. All four cylinders are pivotally positioned on the drum with conventional means, such as pivots 164 and 165. The four cylinders are conventional, hydraulic cylinders and are installed to be remotely controlled by conventional means so that an operator need not be present in the drumhead vicinity during opening and/or closing of the coke drum. The cylinders are also connected to the drumhead 166 by conventional means, such as pivots 167 and 168.

In operation, the cylinders are remotely actuated initially in unison to lower drumhead 166 straight down to clear the locking ring 169. When drumhead 166 has cleared the locking ring, it is moved away from the opening through simultaneous operation of the four cylinders and an offset hydraulic cylinder 170, as illustrated in FIG. 2. The offset hydraulic cylinder 170 is of conventional type and may be affixed to a conventional support, not shown. It is also attached to drumhead 166 in a conventional manner, such as pivot 171. Also shown is spool piece 172, referred to as a ring support member in U.S. Pat. No. 5,048,876.

The operation of the combined locking ring and trammel pivot device of the present invention enables the head of a coker unheading device to be remotely released, removed and positioned away from the drum opening, even in installations where there is a relatively short distance between the bottom of the drum and its adjacent deck. As illustrated in FIG. 2, only a relatively small amount of space is required to disengage the drumhead from the locking ring and to displace it away from the drum opening.

Referring to FIGS. 3 and 4, the trammel pivot apparatus of the present invention is shown with a maintenance support stand, a cable system arrangement in conjunction with the single hydraulic cylinder used for lateral movement, and is shown in both a closed and opened position. Referring specifically to FIG. 3, the single hydraulic cylinder 173 is provided with a cable 174, pulleys 175 and 176 as one option available to move the drumhead 166 horizontally out of the path of the opening in drum 161. In this embodiment, when the drumhead 166 has been lowered to clear locking ring 169, the cylinder 173 is operated simultaneously with the four main cylinders to move the drumhead 166 to a horizontal position out of the line of flow of discharged coke from the drum. In this maintenance position, drumhead 166 rests on a conventional maintenance support stand 177 at a convenient height for cleaning. Also, if desired, each front and back pair of the four main cylinders may be extended differentially to place the drumhead 166 in an inclined position, such as illustrated in FIG. 2, for convenience in cleaning and gasket replacement.

In FIG. 4, the FIG. 3 embodiment is shown with the drumhead in a closed position. In both FIGS. 3 and 4, the deck 178, the drum 161, the spool piece 172, the locking ring 169 and the cylinders 162 and 163 are shown.

The principal advantage of the trammel pivot apparatus over the pivoted head invention as described in U.S. Pat. No. 5,098,524 is the ability to operate in installations where the space under the coke drum is restricted. When this space is sufficiently restricted to prohibit pivoting the head, the trammel pivot of the present invention may be advantageously used to provide a remotely controlled coker unheading device. Also, even in environments where the space under the coke drum is not restricted, the trammel pivot apparatus of the present invention may also be advantageously employed.

As with the locking ring/hinged head arrangement as previously described, the present invention including the locking ring, is suitable for totally remote operation. Also, another advantage of the present invention in comparison to the hinged or pivoted head unheading device of U.S. Pat. No. 5,098,524 that the head can be placed in a more convenient position for cleaning and gasket replacement. Additional operator safety results from the fact that the cleaning crew does not need to work under the open coke drum as in the case with the hinged head device of U.S. Pat. No. 5,098,524. Also, there is a measure of structural advantage in the trammel pivot apparatus of the present invention compared to the hinged head device in that four main hydraulic cylinders are used rather than two. Although additional welding is required, the use of four attachment pads yield a better distribution of the load to the cone than do two attachment pads as described in U.S. Pat. No. 5,098,524.

Figure 5:
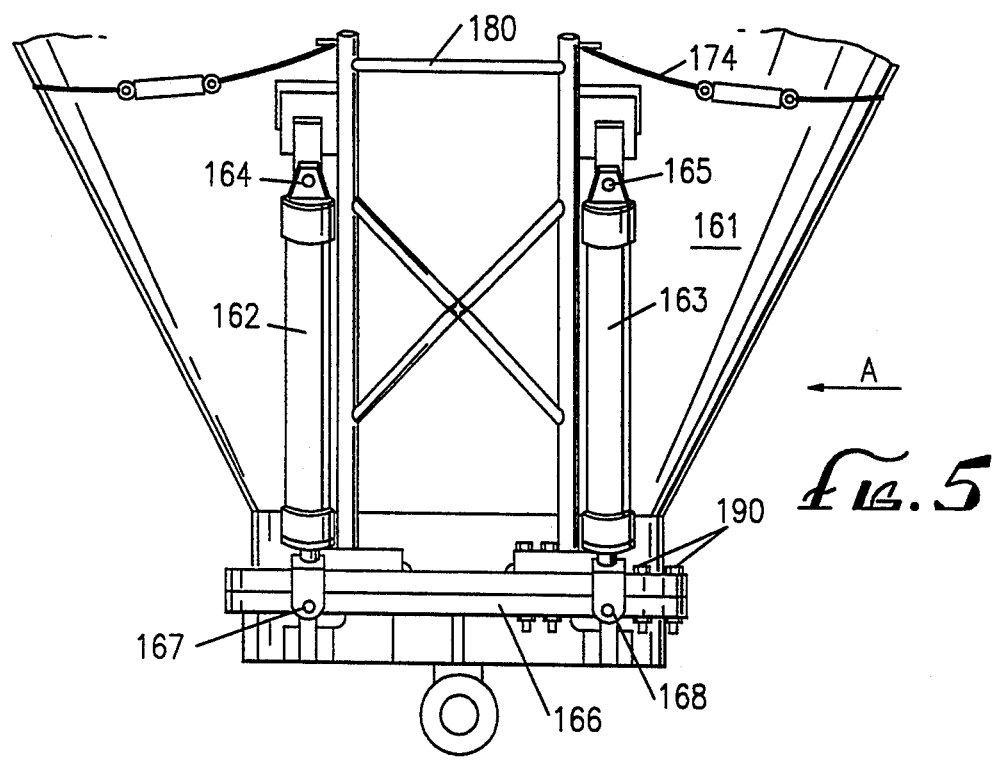
FIGS. 5 and 6 are side views of a trammel pivot apparatus in conjunction with a bolt attachment means, with FIG. 6 being a view from side A of FIG. 5.
Figure 6:
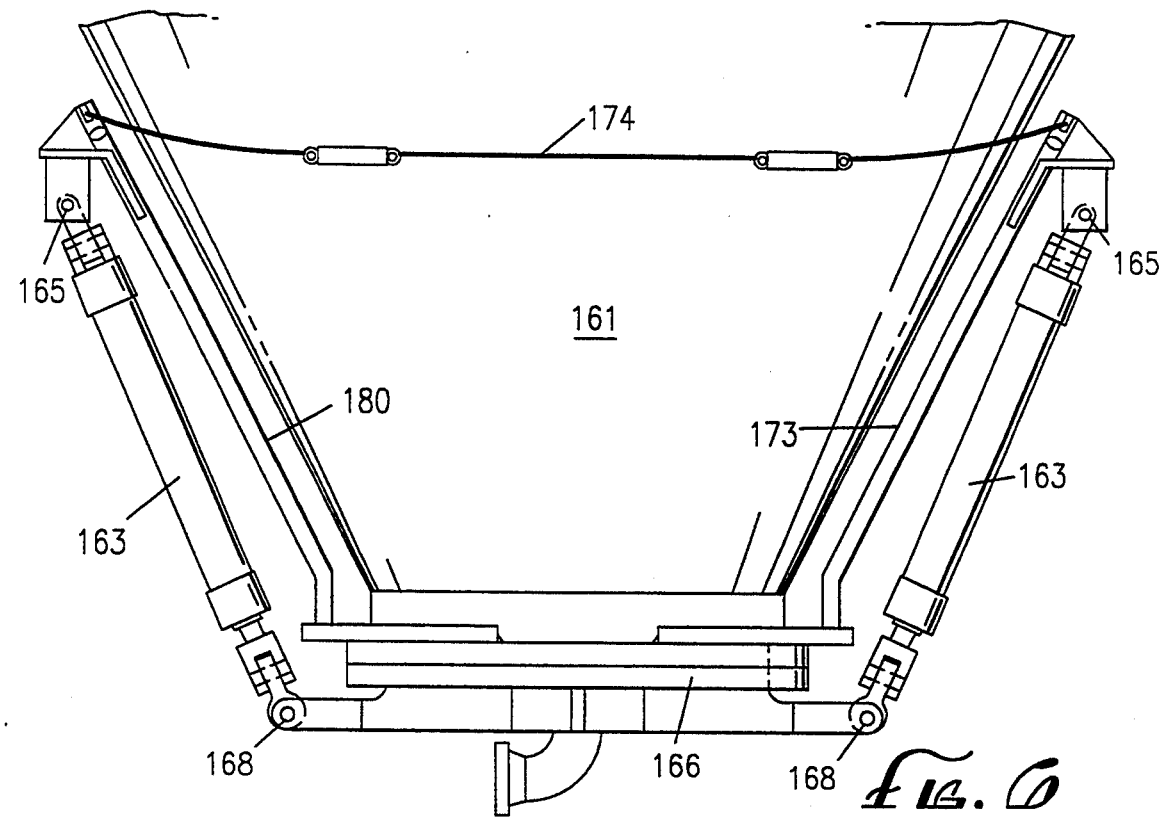

Referring now to FIGS. 5 and 6, the trammel pivot drumhead handling apparatus is shown in conjunction with a conventionally bolted drumhead instead of the locking ring device of FIGS. 1 through 4. The attachment mechanism thus consists of a plurality of bolts 190 which fasten drumhead 166 to the drum 161. Since the drumhead handling apparatus is the same as described previously with respect to FIGS. 2–4, further detailed description of the trammel pivot arrangement need not be undertaken.

Illustrated in FIGS. 5 and 6, however, is a means to support the upper ends of the hydraulic cylinders 162 and 163 that does not require welding to the coke drum 161. In this application of the trammel pivot apparatus, a removable support structure 180 is provided for each pair of hydraulic cylinders 162 and 163 and the corresponding pair on the opposite side. The pivot means 164 and 165 and the corresponding pair on the opposite side are attached to the upper portions of the support structure 180 which is attached at its lower end to the drum outlet flange by conventional bolting means 190. Lateral forces at the upper end of the support structure 180 are taken up by the cable or chain and turnbuckles 174 or similar acting features.

Thus, a drumhead handling apparatus for delayed cokers, has been disclosed. While embodiments and applications of the invention have been shown and described, it will be apparent to those skilled in the art that many more modifications are possible without departing from the inventive concepts herein. The invention, therefore, is to be restricted only in the spirit of the appended claims.

We claim:

1. In a petroleum coke-producing vessel, including a generally cylindrical drum body, a drum outlet, and a removable drumhead at the drum outlet, the improvement comprising a trammel pivot drumhead handling apparatus comprising a plurality of pivoting hydraulic cylinders connected to said drumhead and pivotally connected to said drum body at an upper pivot, and an offset hydraulic cylinder connected to said drumhead, said pivoting cylinders positioned to lower said drumhead from a closed to an open position, and said offset cylinder positioned to move said drumhead laterally between open and closed positions.

2. The vessel of claim 1 to which is attached a removable support structure to support the upper pivot of each hydraulic cylinder.

3. The vessel of claim 2 in which said trammel pivot drumhead handling apparatus comprises four hydraulic cylinders to position and support said drumhead, said four cylinders being positioned in pairs on opposite sides of said drum body.

4. The vessel of claim 2 further including a drum outlet flange at the drum outlet, said support structure being attached to said drum body at the drum outlet flange.

* * * * *